United States Patent [19]
Kirchhoff

[11] 3,946,395
[45] Mar. 23, 1976

[54] RADIO DIRECTION FINDING APPARATUS
[76] Inventor: C. Edward Kirchhoff, Rte. 2, Box 51-A, Conifer, Colo. 80433
[22] Filed: Apr. 17, 1974
[21] Appl. No.: 461,480

[52] U.S. Cl. ............................................ 343/113 R
[51] Int. Cl.² ........................................... G01S 3/48
[58] Field of Search ................................ 343/113 R

[56] References Cited
UNITED STATES PATENTS
3,080,559 3/1963 Thor et al. ...................... 343/113 R Primary Examiner—T. H. Tubbesing
Assistant Examiner—Richard E. Berger
Attorney, Agent, or Firm—Phillip L. DeArment; Gay Chin; J. Herman Yount

[57] ABSTRACT

A circle arc array of element antennas is capable of receiving at all times radio signals from a source located anywhere in a wide angle or complete circle of azimuth directions, the direction of arrival of a received signal being indicated by radio receiving equipment. The source signal received by each element antenna is directed into two or three channels having different phase delays. The output signals from the first channels of all of the element antennas are combined and connected to a first radio receiver, the phase delays in the first channels being equal for all of the element antennas. The output signals from the second channels of all of the element antennas are combined and connected to the input of a second receiver, the phase delays in the second channels all being different from each other in a uniform phase progression. The phase progression corresponds to a clockwise azimuthal progression of the associated element antennas. The phase difference between the signals of the first and second radio receivers indicates the azimuth direction from which the source radio wave is arriving at the antenna array. If desired, counterclockwise-phased output signals from third channels of all of the element antennas may be employed for a redundant indication of azimuth direction of arrival, to reduce errors. Antenna elements may be arranged in the same circular arc array fashion, with the plane of the elements being vertical, in order to measure elevation direction of arrival.

17 Claims, 5 Drawing Figures

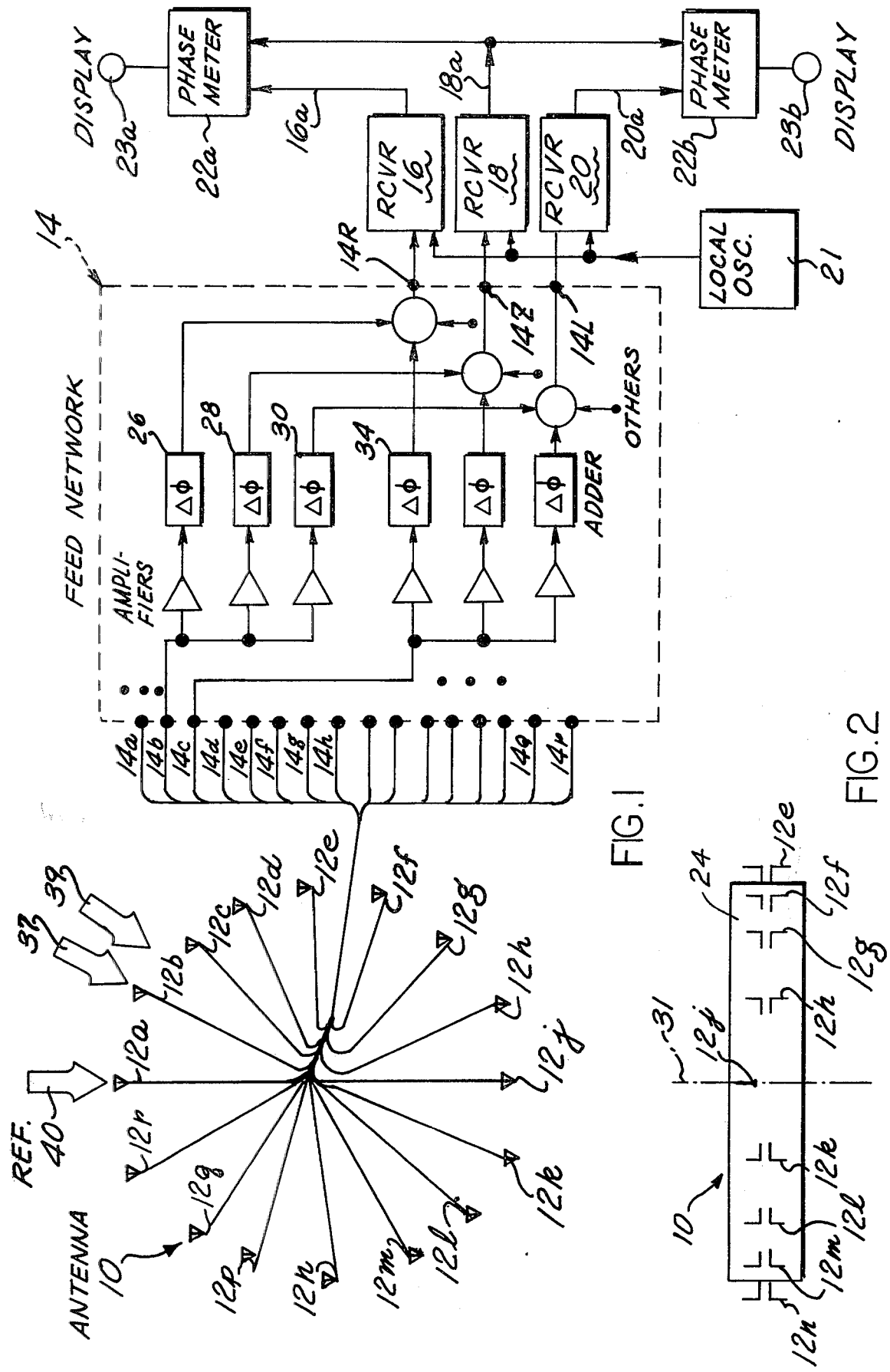

RADIO DIRECTION FINDING APPARATUS

BACKGROUND OF THE INVENTION

The invention is related to the field of radio direction finding and in particular to direction finding by means of circular or cylindrical arrays of antenna elements and associated radio receiving apparatus. Numerous direction finding systems of the prior art employ a circular or cylindrical array of element antennas. Some of the prior systems are suitable for radio direction finding in a range of source directions that is generally broadside to the antenna array, i.e. in the general direction of an axis which is perpendicular to a plane of the circular array of element antennas. Other circularly arrayed direction finding systems of the prior art are suitable for direction finding in and near the plane of the circle of the array. For convenience, directions measured in the plane of the array will be referred to hereinafter as azimuth directions, although no limitation is intended thereby with regard to the orientation of the antenna systems relative to other objects such as a supporting vehicle or the earth. Most azimuth direction finding systems of the prior art have azimuthally directional antenna radiation patterns. For example, a single steerable beam of sensitivity, occupying generally a small sector of the complete azimuthal circle, is provided, which continually revolves through 360° azimuth to locate the azimuth direction from which a target radio wave is coming. In such prior art systems every direction of azimuth is examined once during each revolution of the steerable beam, and each direction is examined for only a fraction of the period of revolution of the steerable beam.

SUMMARY OF THE INVENTION

The present invention is a radio direction finding system employing a planar array of antenna elements destributed over a wide angle of directions and suitable for azimuth direction finding, and which is adaptable additionally for elevation direction finding if desired, by stacking of arrays (with the plane of the circular arc being vertical). The system does not employ a beam that rotates in azimith, but instead is capable of receiving target signals from a wide angle of azimuth directions at all times. Consequently, a source signal arriving from any azimuth direction within the angle is received immediately, and its direction of arrival is indicated.

In accordance with the present invention, a planar array of spaced apart antenna elements are disposed for receiving a radiated signal from a source whose direction is to be determined, the radiated signal establishing phase displaced antenna element signals in element antennas of the array and the phase relationship of the signals in the element antenna depending upon the direction of the source. The element signals from the element antennas are combined in a first predetermined phase relationship to produce a first resultant signal and are also phase-shifted by different amounts, with the phase shift of the signals changing progressively in a predetermined order for the antenna elements, and combined to provide a second resultant signal whose phase with respect to the first resultant signal differs for different directions of the source. The phase difference between the first and second resultant signals is then determined to indicate a direction coordinate in the plane of the array for the source. In the preferred and disclosed embodiment of the invention, the first resultant signal is obtained by introducing the same phase shift, which may be zero phase shift, in signals received from the element antennas when combining the signals to provide the first resultant signal. For receiving through an azimuth angle of 360°, a plurality of element antennas can be arranged in a circle in the azimuth plane.

In a detailed aspect of the invention, each of the element antennas is connected to a different input port of a feed network, which also has three output ports for connection to three radio receivers. A portion of the target signal received by each element antenna is connected to the output port associated with the first radio receiver, the contributions from all of the antenna elements having equal phase delay. The output port associated with the second radio receiver receives, through the feed network, a second portion of the target signal of each of the element antennas, with a different phase delay for each element antenna, and with the phase delay increasing progressively with position (not time) in a clockwise direction around the circular array. The port associated with the third radio receiver similarly has a portion of target signal contributed through the feed network by each of the element antennas, but with a progression of phase delays that increases in a counterclockwise direction around the circle of element antennas.

When a source signal is received, the resulting signals at each of the three radio receivers have different phases, ordinarily. The amounts by which their phases differ are measured; they depend upon the azimuth direction from which the source radio wave is received, and hence the direction is indicated. The phase difference between signals at the first and second receivers is a measure of the azimuth direction from which the target radio wave is being received, measured clockwise from a fixed reference direction. If desired, a second somewhat redundant measurement of the azimuth direction of the target may be obtained by measuring the difference in phases of signals in the first and third radio receivers. This phase difference is equal to the azimuth direction of target signal measured in a counterclockwise sense from a fixed reference direction.

If the antenna system is arranged to include several layers of azimuth arrays of antenna elements, for example to have a cylindrical shape, the antenna system may be employed with additional radio receivers and a similar coupling network to provide elevation readings in a similar manner.

Accordingly, one object of the present invention is to provide radio direction finding apparatus that is sensitive simultaneously in a wide angle of azimuth directions or even a full circle of azimuth, and which has only a few radio receivers.

A second object is to provide radio direction finding apparatus that produces more than one somewhat independent indication of the direction of a radiation source so as to reduce the error of measurement.

An additional object of the invention is to provide radio direction finding apparatus including a plurality of element antennas arranged in a sector of a circle or a complete circle, all connected with a feed network that distributes portions of the target signal received at each element antenna, with various phase delays, to two ports, to which the input terminals of two radio receivers are connected respectively, one of the portions of target signals from each of the element antennas being combined in the feed network with a corresponding portion of signal from each of the other element antennas with equal phase delays to feed the first receiver, and the other portion of signals from all element antennas being combined with differing phase delays porportioned to the geometrical location on the circle of the respective element antenna to feed the second receiver, and further including means for comparing the relative phases of resultant signals in the two radio receivers to ascertain source direction.

A still further object of the present invention is to provide radio direction finding apparatus as in the immediately preceding object and further including an additional portion of target signal from each of the element antennas, the additional portions being phase-delayed by varying amounts progressively in an opposite order of the locations of the element antennas, with the combined phase-delayed signals being connected at a third port to a third radio receiver, and further including apparatus for comparing the relative phases of the resultant signals in the third receiver and the first and/or second receiver.

Yet another object is to provide radio direction finding apparatus as in any of the foregoing objects and in which a plurality of element antennas are stacked in elevation to provide, in connection with additional coupling networks and receivers, elevation direction readings in a manner similar to that in which the azimuth direction readings are provided, that is, by phase measurements among signals of the receivers.

Another object is to provide radio direction finding apparatus that is sensitive at the same time to radiation received from any azimuth direction and from, within a band of elevation, any elevation direction, to indicate both the azimuth and elevation directions of the source.

DESCRIPTION OF THE DRAWINGS

Further objects and features of the invention will become apparent upon consideration of the description which follows, in conjunction with the drawings, in which:

FIG. 1 is a block diagram of a preferred embodiment of the radio direction finding system suitable for azimuth direction finding;

FIG. 2 is a side elevation view of a circular array of element antennas for the system of FIG. 1;

DESCRIPTION OF THE PREFERRED EMBODIMENT

A preferred embodiment of the invention, which is capable of monitoring at the same time radio source signals coming from any azimuth direction, is shown in FIG. 1.

The principle of operation is that a plurality of element antennas receive radiation from a single source and the output signals of the element antennas are combined following various phase delays, to produce three resultant signals. A first radio receiver receives a combined or resultant signal that is substantially independent of source direction; the second and third receivers have resultant signals whose phases depend in different ways upon source direction. It is necessary then only to compare the phase of the first receiver's signal with the phase of the signal in one or both of the other two receivers to ascertain the source direction.

The preferred antenna array 10 advantageously has sixteen element antennas 12a, 12b, etc., each of which is connected to a feed network 14.

Figure 3:
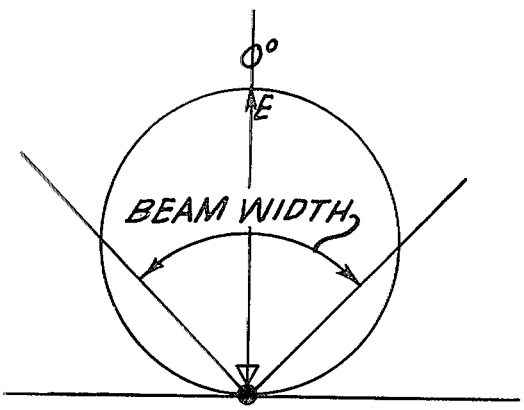
FIG. 3 shows a principal lobe of a simplified azimuth radiation pattern of an element antenna.

For some uses, the antenna array 10 may advantageously employ half-wave dipole element antennas as shown in FIG. 2, which is a side view of the array. When this type of element antenna is employed, a radiation reflector 24 is preferably placed one-fourth of a wavelength behind each element antenna, and may form a cylinder 24. The principal lobe of an H-plane radiation pattern of an element antenna of FIG. 2 is shown in simplified form in FIG. 3. Advantageously, but not necessarily, the beamwidth is less than 100° between half-power points. Output signals from the element antennas 12a, 12b, etc. are conducted through cables to input terminals 14a, 14b, 14c, etc. respectively of the feed network 14 as shown in FIG. 1.

Signals from the array 10 are processed in the feed network 14 principally by being directed to several channels, delayed as to phase, and combined. For microwave frequencies, the feed network 14 preferably comprises a three decibel quadrature coupler matrix of a type whose design is routine for those of ordinary skill in the microwave art. Networks of this type, for example, are described in "Radar Handbook" by Skolnik, published in 1970 by McGraw-Hill Book Company, Inc., New York, especially at page 11–66. The functions of the feed network 14 of FIG. 1 can be more clearly explained, however, in terms of an equivalent network constructed of discrete components such as might be employed for radio signals below microwave frequencies.

The signal from the element antenna 12b, which appears at the terminal 14b, is typical. It is divided into three portions, each going to a different channel where first it is amplified. The phase of the signal of a first portion is shifted 22-½° by a phase delay device 26. The delayed signal is connected to a junction point 14R along with signals, which have been delayed by differing amounts, from all of the other antenna elements. The signal from element antenna 12a is delayed 0°; the signal from element antenna 12b is delayed by 22-½°; the signal from element antenna 12c is delayed by 45°, and so forth in 22-½° increments around the entire array. The feed network 14 has three output ports, 14R, 14Z, and 14L., each of which has a signal which is the result of different processing by the feed network 14.

A second portion of the signal at the typical terminal 14b is connected through an isolating amplifier and a phase delay circuit 28 to the port 14Z of the coupling network 14, where it joins with similar signals from all of the other element antennas. Any phase delay introduced by the isolation amplifiers and the phase delay circuits 28 leading to terminal 14Z is equal for all of the element antennas, so that all element signals add in phase at terminal 14Z. The output port 14Z therefore has no added phase progression of its component signals around the antenna array, all of its component signals being added with phases as received.

The amplitude radiation pattern for signals received at the port 14Z is approximately toroidal, with the principal plane of the toroid being the azimuth plane, which is perpendicular to the axis 31 of the array as shown in FIG. 2. The beam pattern of junction 14R is therefore a figure of revolution about the axis 31.

A third component of signal from the terminal 14b passes through a phase delay network 30 to the output port 14L of the coupling network 22, where it is combined additively with signals from all of the other element antennas. All of the element antennas connected to the output port 14L experience different phase delays in their phase delay devices, however. The phase delays are in 22-½° increments and in a counterclockwise progression around the antenna array 10, unlike the clockwise progression of phase delays of the component element signals at the output port 14R.

Figure 4:
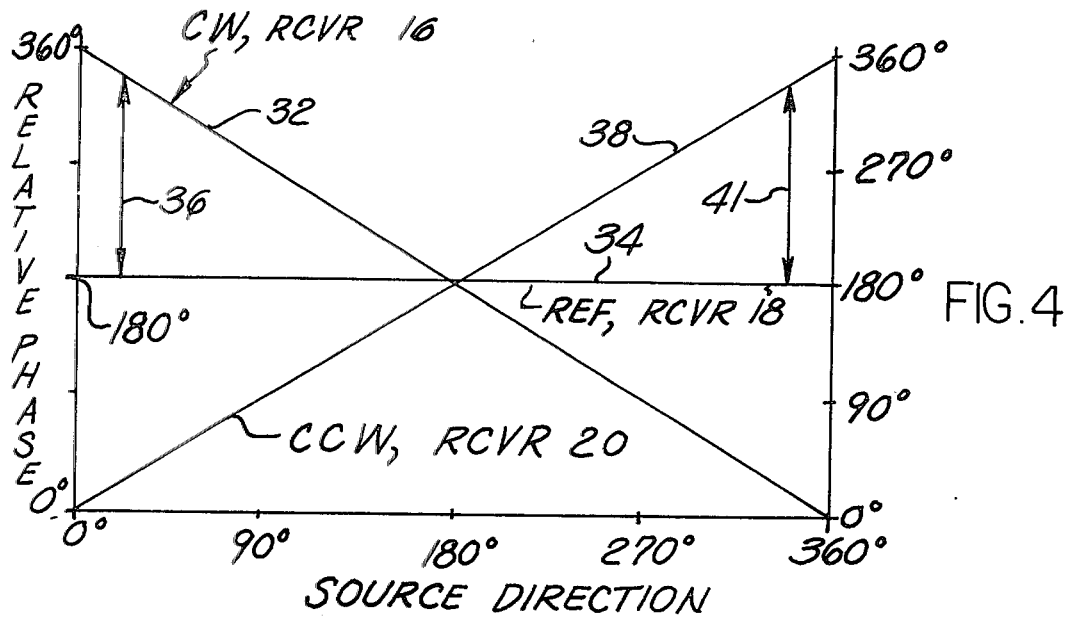
FIG. 4 is a graph of the phase delays provided by the feed network of FIG. 1 for the array as a whole for different source directions.

The phase relationships between the resultant signals at each of the three output ports 14R, 14Z, 14L of the coupling network 14 are shown in FIG. 4 as a function of azimuth direction of the radiation source. Three radio receivers 16, 18, 20 amplify the signals of the ports 14R, 14Z, 14L.

The receivers 16, 18, 20, are tuned to the frequency of the received radiation, and serve primarily to reduce the noise and unwanted signals of the system by reducing the bandwidth, and to amplify the signals for the output ports 14R, 14Z, 14L, respectively. Preferably the receivers also down-convert their signals to a lower frequency without altering their relative phase, by using a local oscillator 21 in common. Output signals at terminals 16a, 18a, respectively of the receivers 16, 18, are connected to a phase meter 22a, which compares the phase of the output signal from the receiver 16 with the phase of the output signal from the receiver 18, and produces an indication proportional to the phase difference, which it displays on a meter 23a. Similarly, signals of receivers 18 and 20 are compared by a phase meter 22b, and a quantity proportional to their relative phase is displayed on a meter 23b. The phase meters 22a, 22b can be any of a variety of types, many of which are well known and used in the prior art and some of which are described in a book "Electronic Measurements," F. Terman and J. Pettit, McGraw Hill, N.Y., N.Y., 1952, pages 271–75. Preferably a balanced modulator type of phase meter such as is shown on p. 273 is employed.

As seen on the graph of FIG. 4, the phase 32 of signals at the output port 14B varies linearly as a function of the azimuth direction of arrival of the received radiation. The phase 34 of signals at the output port 14Z is independent of the direction of the radiation source, and can serve as a convenient phase reference for measurement of the relative phase 32 of the signal at the output port 14R. The phase meter 22a measures the phase difference to ascertain the direction of arrival of the source signal. Advantageously, signals at port 14Z can have 180° delay with respect to the phase of signals at the terminals of the element antennas, this fixed 180° offset of phase merely fixing a reference direction 40.

The operation of the system of FIG. 1 for azimuth direction finding will be described for a radio wave 37 received from a radiation source lying in the direction of the element antenna 12b. The radio signal received by element 12b is conducted to the terminal 14b where it is directed into the three channels having isolation amplifiers and the phase shifters 26, 28, 30. Each of these signal portions, after being combined with signals from other element antennas, is connected to a respective one of the receivers 16, 18, 20.

Signals received from the radio source by the element antennas 12a and 12c also contribute to the signal of the receiver 18, because the signal components from all element antennas that are connected to the receiver 18 are all substantially in phase, except for any delays due to differences in path length occurring as a result of the geometrical placement of the element antennas on the circle of the array 10.

The clockwise phase progression portion of the source signal 37 received by the element antenna 12a is delayed by its phase-shifting device and conducted to the output port 14R of the coupling network 14; the clockwise phase progression component of source signals 37 received by the element antenna 12c is also phase shifted, and combined with all of the other clockwise phase progression signals at the port 14R. If the signal at the port 14R which is contributed by the element antenna 12a were resolved into quadrature components, with one component being in phase with the signal contributed at 14R by the antenna 12b, then the other quadrature component of signal contributed by the antenna 12a would of course be in quadrature with the signal at that port contributed by the antenna 12b; if the signal contributed at the port 14R by the element antenna 12c were similarly resolved into quadrature components that are in phase and out of phase with the portion of signal contributed by the element antenna 12b, the quadrature component contributed at port 14R by the element antenna 12 a would be seen to be equal and opposite to the quadrature component of signal contributed by the element antenna 12c, so that those quadrature components cancel for the source direction 37. The phase of the signal at port 14R is therefore approximately the phase of the phase shifter 26 for clockwise progression signals, heuristically speaking.

In a similar manner, signals received at the element antennas 12r and 12d contribute to the signal strength at all of the output ports 14R, 14Z, 14L, and do not disturb the direction finding capability of the system. This summation effect occurs for all element antennas of the array 10 that are directed such that their element patterns receive significant amounts of power from the radio wave, for source direction 37.

The signal 37 arriving from a radio source in the direction of the element antenna 12b has a phase delay difference, between the clockwise phase progression signal of output port 14R and the zero phase progression signal of output port 14Z, of +157.5°, as shown by line 36 of FIG. 4. The direction of arrival is measured 22.5° clockwise from the direction reference vector 40, because the reference channel was offset 180°. No other direction of arrival produces this phase difference; the phase meter 22a, by measuring this phase difference, and the meter 23a, by indicating it, provide an unambiguous indication of the direction of arrival of the source radio wave.

Similarly, the phase 38 of signals at the output port 14L can be measured by the phase detector 22b, with respect to the zero phase progression signal 34 at the port 14Z, which again serves as a phase reference, to provide a second indication 41 the direction of arrival, 337.5°, of the source wave. Measurements obtained with receiver 20 are reckoned in a counterclockwise direction with respect to the reference direction vector 4 of FIG. 1; they indicate the same geometrical direction of the source, and therefore represent a redundant signal. By combind the two phase measurements made by the phase detector 22, for example, by averaging them, the error is reduced; for those components of system noise which are Gaussian and random as between the clockwise and counterclockwise phase measurement systems, a reduction to 70.7% of the noise is accomplished.

For a radio wave received from a different direction 39 intermediate the antennas 12b and 12c, it is clear that the system interpolates between signals of element antennas 12b and 12c, because they both contribute significantly to the signals of the three receivers 16, 18, 20 as do many of the neighboring element antennas.

If another radio source signal is received from the same or different direction at the some time as the first signal and with a frequency which differs from the frequency of the first signal by an amount exceeding the tuning bandwidth of the receivers 16, 18, 20, the presence of the second signal does not affect the measurement of the first signal. Additional receivers could be connected to the ports 14R, 14Z, 14L in parallel with the inputs of the receivers 16, 18, 20 if desired to find the directions of signals of different frequencies simultaneously.

If, after acquisition of a signal, it is desired to improve the signal-to-noise ratio, the array 10 and its feed network could be switched to a directional mode of operation. Directivity can be achieved by any of a great number of methods that are fully described in the prior art.

For situations in which a priori information is at hand indicating that the source signals of interest will never come from certain angular sectors of azimuth, the element antennas 12 of the array 10 need not be distributed over a full circle. In such a case, the resolution of the system for direction finding may be increased by distributing 360° of phase shift across an array of element antennas whose geometric span is less than 360°. The phase difference readings obtained by the phase meters 22a, 22b would then be interpreted by the use of a multiplying factor to convert phase difference measurements to source direction information, and an offset term if necessary.

The same system is suitable also for measuring source elevations. To illustrate this simply, the antenna array 10 of FIG. 1 could be oriented with element antenna 12a directed to the zenith and the element 12j directed to the nadir, in which case the system of FIG. 1 would measure elevations within a toroidallyshaped volume, with only the element antennas 12e and 12n being in a azimuth plane. Identical systems could be added with other azimuthal orientations, to fill out a complete circle of azimuth, and if desired, zenith and nadir elements such as elements 12r, 12a, 12b, and elements 12h, 12j, 12k, and the corresponding elements of the similar arrays having other azimuthal orientations, could be omitted. Elevation angles could then be measured for any azimuth within a limited band of elevation excluding the zenith and nadir.

Of course, the signals from each element antenna can be further divided at terminals 14a-14r, and used both in an elevation system and in an azimuth system, employing one threedimensional array of element antennas. Both elevation and azimuth readings can be made throughout a full 360° of azimuth if desired, and within a band of elevations centered at the azimuth plane. Instead of a plurality of complete systems of the type shown in FIG. 1 and just described, however, a composite system employing some equipment in common, in addition to the element antennas which are already being employed in common, can be provided to effect some economies in equipment when both elevation and azimuth are to be measured.

Figure 5:
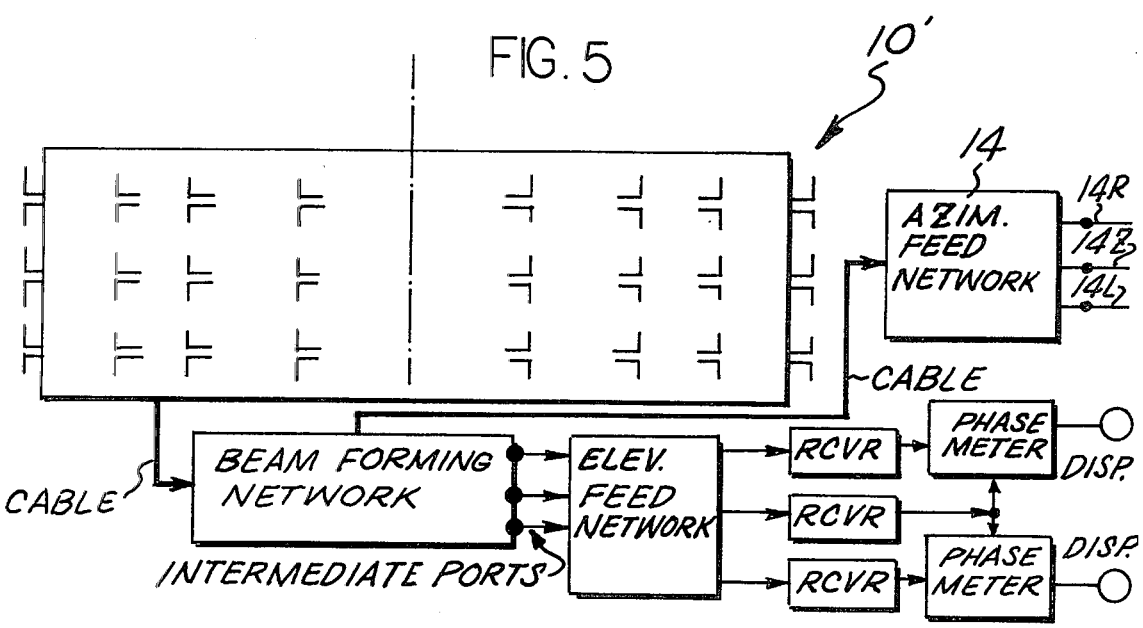
FIG. 5 shows a side view of a portion of a second embodiment of the invention in which several tiers of element antennas are stacked in elevation for providing elevation direction information as well as azimuth information.

A cylindrical array 10' of vertically stacked antenna elements can be employed, as shown in FIG. 5. The cylindrical array can provide angle of arrival information in a volume of, for example, ±30° from the azimuth plane. The stacked elements are phased to produce a plurality of quasi-toroidally-shaped beams directed at various elevation angles, each elevation angle corresponding to a different intermediate port of a coupling network. Each of these intermediate ports corresponds to a beam elevation, and the intermediate ports take the place of the element antenna terminals of the azimuth system. Considering for a moment the element antennas that are stacked at a particular azimuth angle, one portion of the particular beam signal received at each of these intermediate ports would join a similar portion from all of the other intermediate ports at that same azimuth angle, with equal phase shifts, to produce a zero phase reference elevation signal at a receiver input port. A second portion of particular beam signal received at each of the intermediate ports at that azimuth angle would be phase shifted with an increasing phase progression from the lowest beam in the group to the highest, and all such shifted portions would be combined at a second receiver input port of the system. Clearly then, elevation direction finding can be combined with azimuth direction finding either by switching a few receivers 16, 18, 20, among the various feed system ports or by providing additional receivers. If desired, a third output port representing phase displaced signals of progressively decreasing phase displacement from the lowest to the highest beam can also be provided, for redundant elevation information, as was described above in more detail with regard to the azimuth direction finding system.

The beam-forming feed network that provides a plurality of different-elevation beams at the aforsaid intermediate ports can be networks with several phase shifters for each individual element antenna, or preferably a Butler type of matrix, or a monopulse type of beam-forming network. These feeds produce the overlapping elevation beams which are used to yield the elevation angle of arrival.

The foregoing embodiment of the invention is a direction finding system for radio waves that is alert simultaneously in all azimuth directions and in a range of elevation directions. When a target signal is received, the system provides azimuth direction information by measuring the phase difference between signals in a plurality of receivers, where each receiver corresponds not to a particular azimuth but to a particular phase progression; it provides elevation information in an identical manner by measuring the phase difference of signals in a plurality of receivers.

Because of a well-known principal of reciprocity between the behavior of receiving antenna systems and transmitting antenna systems, the invention applied to both receiving and transmitting systems.

I claim:

1. In a radio direction finding apparatus comprising a plurality of spaced apart element antennas for receiving a radiated microwave signal from a source whose direction is to be determined, the radiated signal establishing phase displaced antenna element signals in element antennas of said array with the phase relationship of the signals depending upon the direction of the source, first means for combining said phase displaced antenna element signals to provide first and second resultant signals in the microwave range whose relative phases indicate the direction of said source and means for down-converting said resultant signals to an intermediate frequency signal and for measuring the phase difference therebetween, said first means comprising a quadrature coupler matrix for combining said antenna element signals at the frequency of received radiation for providing said first and second resultant signals.

2. Radio direction finding apparatus comprising a planar array of spaced apart element antennas for receiving a radiated signal from a source whose direction is to be determined, the radiated signal establishing phase displaced antenna element signals in element antennas of said array with the phase relationship of the signals depending upon the direction of the source, combining means for combining said element signals in a first predetermined phase relationship in which any phase shift introduced into said element signals is equal for all element signals to produce a first resultant signal, additional means for phase shifting the element signals by different amounts with the phase shift changing progressively in a predetermined order of said antenna elements and combining said signals to provide a second resultant signal whose phase with respect to said first resultant signal differs for different directions of the source, and means for measuring the phase difference between said first and second resultant signals to indicate a direction coordinate in the plane of the array for the source, whereby the phase of said first resultant signal is substantially independent of the direction of the source.

3. Radio direction finding apparatus as defined in claim 2 and wherein said additional means for phase-shifting the element signals by different amounts comprises means for providing different amounts in equal increments for different ones of the element antennas progressively from element to element of the array.

4. Radio direction finding apparatus as defined in claim 2 further comprising at least one additional planar array of element antennas in a plane parallel to and spaced apart from the foregoing planar array for receiving element signals from the same radiation source; additional combining means for combining all of said element signals in a third predetermined phase relationship in which any phase shift introduced into said element signals is equal for all element signals, second additional means for phase shifting the element signals establishing a fourth predetermined progression of relative phase shifts among the element signals successively in proceeding from one planar array to another in a direction transverse to the planes of the arrays, means combining the signals having said fourth predetermined progression of phase shifts to produce a fourth resultant signal, and means for measuring the phase difference between said third and fourth resultant signals to obtain a second indication of direction of the source measured in a coordinate direction transverse to the coordinate direction of the first indication.

5. Radio direction finding apparatus comprising a planar array of spaced-apart element antennas each for receiving a respective element signal from the same radiation source, first means for combining the element signals with equal phase shifts to produce a first resultant signal whose phase is substantially independent of direction of the source, means for phase-shifting the element signals by different amounts for different element antennas, second means for combining the phase-shifted element signals to produce a second resultant signal whose phase is different for different directions of the source, and means for measuring the phase difference between said first and second resultant signals to indicate a coordinate of direction of the radiation source, said coordinate being in the plane of the array.

6. Radio direction finding apparatus as defined in claim 5 wherein said first means for combining the element signals, said means for phase-shifting the element signals by different amounts and said second means for combining the phase-shifted element signals are all comprised of a quadrature coupler matrix feed network coupled to said antenna elements and wherein said quadrature coupler matrix combines antenna element signals at the frequency of received radiation to provide said first and second resultant signals.

7. Radio direction finding apparatus as defined in claim 5 and wherein said array comprises element antennas at different angular locations on a circle arc, and each of said different amounts of phase shift is proportional to the angular location of the respective element antenna measured in a first sense of rotation along said circle arc.

8. Radio direction finding apparatus as defined in claim 7 and wherein said circle arc is a complete circle and said element antennas are at equally spaced angular locations therearound.

9. Radio direction finding apparatus as defined in clsim 5 and wherein each of said element antennas has a radiation pattern whose principal lobe is narrower than 100° between halfpower points.

10. Radio direction finding apparatus as defined in claim 7 and further comprising additional means for phase-shifting each of said element signals by an amount of phase shift that is proportional to the angular location of the respective element antenna measured in a second sense of rotation along said circle arc opposite said first sense of rotation, and further comprising third means for combining the phase-shifted element signals of said second sense of rotation to produce a third resultant signal whose phase is different for different directions of the source, and further comprising additional means for measuring the phase difference between said first and third resultant signals to indicate direction of the radiation source.

11. Radio direction finding apparatus comprising a plurality of element antennas arrayed at equal angular intervals in a circle for receiving signals from a radio source; a feed network including first means for additively combining the element signals with the same relative phases with which they were received, second means for shifting the relative phases of the element signals with the phase shifts progressively increasing uniformly from element antenna to element antenna around said circle, and third means for additively combining the progressively phase-shifted element signals; and phase comparator means connected with said first and third combining means, for measuring the phase difference between resultant signals of the first and third combining means to indicate a source directional coordinate in the plane of said circle.

12. Radio direction finding apparatus as defined in claim 11 and wherein said second means for shifting the relative phases of said element signals comprises means for shifting the phases progressively in increments of 360/N° per element antenna when the number of element antennas is N.

13. Radio direction finding apparatus as defined in claim 11 and wherein each element antenna has a directive radiation pattern with a principle lobe, each such principal lobe being in the direction of a radial line extending from the center of said circle through the location of the respective element antenna.

14. Radio direction finding apparatus as defined in claim 11 and wherein said feed network comprises 3 dB quadrature coupler matrix means for shifting the phases of and combining said element signals.

15. A method of radio direction finding comprising the steps of providing a planar array of element antennas spaced apart symmetrically over a span of directions, each element antenna receiving an element signal from the same radiation source; establishing a first predetermined progression of relative phase shifts in which the relative phases among element signals are maintained the same as when received by the element antennas; combining the signals having the first progression of phases shifts to produce a first resultant signal; establishing a second predetermined progression of phase shifts among the element signals successively with respect to direction along the array, said second relative phase shifts being progressive from element antenna to element antenna; combining the signals having said second predetermined progression of phase shifts to produce a second resultant signal; and measuring the phase difference between said first and second resultant signals to obtain an indication of direction of the source.

16. A method of radio direction finding as defined in claim 15 and comprising the further steps of providing at least one additional planar array of element antennas in a plane parallel to and spaced apart from the foregoing planar array for receiving element signals from the same radiation source; establishing a third predetermined progression of equal phase shifts among the element signals; combining the signals having said third predetermined progression of phase shifts to produce a third resultant signal; establishing a fourth predetermined progression of relative phase shifts among the element signals successively in proceeding from one planar array to another in a direction transverse to the planes of the arrays; combining the signals having said fourth predetermined progression of phase shifts to produce a fourth resultant signal, and measuring the phase difference between said third and fourth resultant signals to obtain a second indication of direction of the source measured in a coordinate direction transverse to the coordinate direction of the first indication.

17. In a radio direction finding apparatus comprising a plurality of spaced apart element antennas for receiving a radiated signal from a source whose direction is to be determined, the radiated signal establishing phase displaced antenna element signals in element antennas of said array with the phase relationship of the signals depending upon the direction of the source, first means for combining said phase displaced antenna element signals to provide first and second resultant signals whose relative phases indicate the direction of said source, and means for measuring the phase difference therebetween, said first means comprising a quadrature coupler matrix for combining said antenna element signals at the frequency of received radiation for providing said first and second resultant signals.

* * * * *